United States Patent [19]
Kawashima et al.

[11] Patent Number: 6,048,953
[45] Date of Patent: *Apr. 11, 2000

[54] CURABLE LIQUID RESIN COMPOSITION

[75] Inventors: Miki Kawashima; Kunio Horiuchi; Hiroaki Tanaka, all of Tokyo, Japan

[73] Assignee: Toyo Ink Manufacturing Co., Ltd., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/000,474

[22] PCT Filed: Jun. 2, 1997

[86] PCT No.: PCT/JP97/01871

§ 371 Date: Feb. 3, 1998

§ 102(e) Date: Feb. 3, 1998

[87] PCT Pub. No.: WO97/46601

PCT Pub. Date: Dec. 11, 1997

[30] Foreign Application Priority Data

| Jun. 3, 1996 | [JP] | Japan | 8-139824 |
| Jun. 24, 1996 | [JP] | Japan | 8-162781 |
| Jul. 22, 1996 | [JP] | Japan | 8-191704 |
| Sep. 10, 1996 | [JP] | Japan | 8-238812 |
| Sep. 10, 1996 | [JP] | Japan | 8-238814 |

[51] Int. Cl.$^7$ .......................... C08F 220/10; C08F 220/18
[52] U.S. Cl. .................... 526/318.4; 526/329.2; 526/329.3; 526/330; 526/332; 526/342; 526/242; 526/279; 526/318.41; 526/318.42; 525/303
[58] Field of Search .............. 526/318.4, 329.2, 526/329.3, 330, 332, 342, 242, 279, 318.41, 318.42; 525/303

[56] References Cited

U.S. PATENT DOCUMENTS

| 4,952,655 | 8/1990 | Serlmann-Eggebert et al. | 526/318.4 |
| 5,180,756 | 1/1993 | Rehmer et al. | 522/35 |
| 5,310,813 | 5/1994 | Nagasawa et al. | |
| 5,576,405 | 11/1996 | Kawashima et al. | 526/318.4 |
| 5,644,010 | 7/1997 | Kurihashi et al. | 526/318.42 |
| 5,686,545 | 11/1997 | Kawashima et al. | 526/318.4 |

FOREIGN PATENT DOCUMENTS

| 43 16 317 | 11/1994 | Germany . |
| 0 556 649 | 8/1993 | United Kingdom . |
| 0 745 653 | 12/1996 | United Kingdom . |

OTHER PUBLICATIONS

*Patent Abstracts of Japan*, 13(197) (P–868), abstract of JP 1–018142 (May 1989).

*Primary Examiner*—Fred Zitomer
*Assistant Examiner*—N. Sarofim
*Attorney, Agent, or Firm*—Wenderoth, Lind & Ponack, L.L.P.

[57] ABSTRACT

A curable liquid resin composition containing 100 parts by weight of the following (meth)acrylic liquid resin (A) and 1 to 1,000 parts by weight of a (meth)acrylic monomer (B) having an unsaturated double bond in its molecule and having a number average molecular weight of 1,000 or less, the (meth)acrylic liquid resin (A) being a liquid resin which is obtained by polymerizing monomers containing an alkyl (meth)acrylate monomer (a-1-1) of the formula (1), $$CH_2 C(R^1)COO-R^2 \qquad (1)$$

wherein $R^1$ is a hydrogen atom or $CH_3$ and $R^2$ is an alkyl group, and/or an alkylene glycol (meth)acrylate monomer (a-1-2) of the formula (2), $$CH_2=C(R^1)COO(C_nH_{2n}O)_mR^3 \qquad (2)$$

wherein $R^1$ is a hydrogen atom or $CH_3$, $R^3$ is an alkyl group or a phenyl group, n is an integer of 1 to 3, and m is an integer of 3 to 25, and other polymerizable vinyl monomer (a-2), an average of molecular weights of all the monomers being 100 to 1,500, the liquid resin having a number average molecular weight of 10,000 to 200,000 and a viscosity of 1 to 10,000 poise (measured at 50° C.), or a modified product of the above liquid resin, the curable liquid resin composition can form a film as a film-forming material or as a resin for an adhesive without using a solvent and give a cured film.

24 Claims, No Drawings

CURABLE LIQUID RESIN COMPOSITION

TECHNICAL FIELD

The present invention relates to a liquid resin composition which can form a film and give a cured film without using a solvent, as a resin for a film-forming material such as an ink or for an adhesive. Further, the present invention relates to a liquid resin composition containing an acrylic liquid resin and a (meth)acrylic monomer, which can be used as a vehicle for a printing ink, a coating composition, an adhesive, or the like, used as a radiation-curable resin composition.

TECHNICAL BACKGROUND

Conventionally, a coating composition, an adhesive, an adhesive mass, an ink, a filler and a molding material contain resin solutions containing organic solvents. These resin solutions dissipate large amounts of organic solvents in the steps of coating and charging and in the steps of curing and drying. With increasing concerns about global environments and working environments, restrictions have come to be imposed on the use of the above resin solutions. one of methods for overcoming the above problem uses an aqueous solution of a resin, a powder or a hot-melt material. However, an aqueous solution of a resin contains an organic solvent to some extent for improving coating properties, and it can hardly be said that the aqueous solution of a resin is free of an odor in a working environment. Further, not only it is required to incinerate a discharged organic solvent, but also the disposal of its effluent requires an investment. In a coating or charging plant having large-scale equipment for the treatment of discharged gas, the release of an organic solvent to atmosphere can be prevented, while a small-scale plant having no such equipment has a problem that an effluent containing an organic solvent cannot be treated. The coating or charging of a powder or a holt melt requires equipment and a method which are quite different from conventional ones, and it is therefore required to introduce new equipment. For overcoming the above problems, attempts are being made to form a high-solid resin solution and to improve an aqueous solution of a resin, and it is considered that the amount of a resin solution remarkably tends to decrease owing to the above efforts. As an essential solution, however, it is strongly desired to develop a solventless liquid resin which is free from problems concerning pollution, hygienic safety, ignition, explosion, etc., which can be widely applied and which can be easily applied. Further, the solventless liquid resin is required to form a cured film or a shaped article by means of a conventional drying appratus.

Further, concerning a conventional radiation-curable resin composition, its viscosity is controlled by incorporating a large amount of a component having a low molecular weights However, the incorporation of a component having a low molecular weight is not desirable in view of a working environment since it causes problems of odor, etc. There are further another problems that a volume shrinkage takes place at a curing time and a cured film becomes fragile. For improving the curing-caused shrinkage ratio, attempts have been made to use a monomer component having a relatively high molecular weight or to add a component having a high molecular weight. However, since the latter component is in the state a solid, the amount of the component that can be added is limited in order to keep the viscosity of the composition in a proper range. Further, there are problems caused by a large content of a compound having a low molecular weight such as a problem on an odor caused by a residual monomer, and these problems limit the radiation-curable resin composition in use.

JP-A-57-171 discloses a technique concerning a solventless resin composition. This technique uses a liquid resin containing an acrylic monomer, while the technique is desired to be further improved since an obtained resin is an oligomer. Further, in view of physical properties, it is known that it is difficult to control the physical properties of a cured film obtained from a coating composition containing a resin which is in an oligomer region (MUROI Soichi, "Lectures in Society of Adhesion and coating Studies in 1992", Summary Prints of Lectures, page 4, 1993), and it is desired to increase a molecular weight while maintaining a low viscosity.

In reactions for curing resins with various kinds of radiation as a trigger, a radical-based crosslinking reaction and a cation-based crosslinking reaction are well known. A composition using a radical-based crosslinking reaction causes an extreme curing shrinkage. On the other hand, a cation-curable composition containing an alicyclic epoxy compound is improved in curing shrinkage to some extent. However, in particular, when an alicyclic epoxy resin having a low molecular weight and having a low viscosity and a high dilution effect is used, a volume change occurs at a curing time. JP-A-2-289611 discloses an invention of an acrylic resin having an alicyclic epoxy group. It can be said that the above invention further moderates a volume change at a curing time. In this technique, however, the acrylic resin contains a large amount of an organic solvent since it is synthesized by a solution method, and it is required to remove the solvent by some method in order to obtain a solventless resin composition. Further, since a cationic polymerization initiator is used as an essential component, it can be said that there are problems on the safety and hygiene which remain to solve.

Not only for the reaction of an alicyclic epoxy group, but also for the curing reaction with ultraviolet light, it is required to add a large amount of an initiator. The initiator and a sensitizer migrate out of a cured film, and this migration phenomenon has been a problem in view of safety and hygiene. When a high-energy radiation such as an electron beam or y ray is used as a trigger, a radical curable composition requires no catalyst. However, it is pointed out by J. V. Crivello et al that the cationic reaction of an alicyclic epoxy resin essentially requires an initiator, a particularly harmful antimony-containing catalyst, and the cationic reaction of an alicyclic epoxy resin deviates from the advantage of an electron-beam-curable composition that no initiator is required.

The present inventors have made diligent studies of a correlation between the structure and the viscosity of various resin compositions, and as a result, have found a solventless, radiation-curable liquid resin composition which contains a large amount of a component having a high molecular weight but has a viscosity sufficient for film-formability by a conventional film-forming method, and which can be cured at a high rate by a conventional curing method using radiation as a trigger. Further, by introducing an alicyclic epoxy group for a side chain component of a liquid resin having a high molecular weight, there can be obtained a radiation-curable liquid resin composition containing an alicyclic-epoxy-containing resin having a high molecular weight and containing neither an alicyclic epoxy compound having a low molecular weight nor a solvent.

It is an object of the present invention to provide a solventless curable liquid resin composition containing a liquid polymer having a high molecular weight and containing no solvent. The above curable liquid resin composition serves to decrease the amount ratio of a compound having a low molecular weight, which compound causes a problem with regard to safety and physical properties, and it serves to improve working environments. Further, it is another object of the present invention to provide a curable liquid resin composition capable of forming a film by a conventional coating method using a roll coater or a knife coater or a conventional printing method such as an offset printing method, a gravure printing method, a letterpress printing method or a screen printing method. It is further another object of the present invention to provide a radiation-curable liquid resin composition which can be cured by the irradiation with a conventional radiation such as ultraviolet light, electron beam or γ ray, or which can be cured in the absence of a catalyst and an initiator by the irradiation with electron beam or γ ray in particular.

DISCLOSURE OF THE INVENTION

According to the present invention, there is provided a curable liquid resin composition containing 100 parts by weight of the following (meth)acrylic liquid resin (A) and 1 to 1,000 parts by weight of a (meth)acrylic monomer (B) having an unsaturated double bond in its molecule and having a number average molecular weight of 1,000 or less, the (meth)acrylic liquid resin (A) being a liquid resin which is obtained by polymerizing monomers containing 10 to 100% by weight of an alkyl (meth)acrylate monomer (a-1-1) of the formula (1), $$CH_2=C(R^1)COO-R^2 \tag{1}$$

wherein $R^1$ is a hydrogen atom or $CH_3$ and $R^2$ is an alkyl group having 4 to 22 carbon atoms, and/or an alkylene glycol (meth)acrylate monomer (a-1-2) of the formula (2), $$CH_2=C(R^1)COO(C_nH_{2n}O)_mR^3 \tag{2}$$
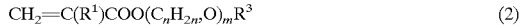

wherein $R^1$ is a hydrogen atom or $CH_3$, $R^3$ is an alkyl group having 1 to 5 carbon atoms or a phenyl group, n is an integer of 1 to 3, and m is an integer of 3 to 25, and 0 to 90% by weight of other polymerizable vinyl monomer (a-2), an average of molecular weights of all the monomers being 100 to 1,500, the liquid resin having a number average molecular weight of 10,000 to 200,000 and a viscosity of 1 to 10,000 poise (50° C.), or the (meth)acrylic liquid resin (A) being a modified product of the above liquid resin.

Further, in the above curable liquid resin composition provided according to the present invention, the (meth) acrylic liquid resin (A) contains 1 to 50% by weight of a vinyl monomer (a-2-1) having a functional group inert to radiation as a polymerizable vinyl monomer (a-2).

Further, in the above curable liquid resin composition provided according to the present invention, the vinyl monomer (a-2-1) is at least one monomer selected from the group consisting of alkyl (meth)acrylate whose alkyl group has 3 carbon atoms or less, an alkylene glycol (meth)acrylate monomer of the formula (3), $$CH_2=C(R^1)COO(C_nH_{2n}O)_mR^3 \tag{3}$$
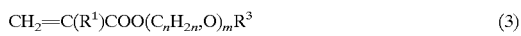

wherein $R^1$ is a hydrogen atom or $CH_3$, $R^3$ is an alkyl group having 1 to 5 carbon atoms or a phenyl group, n is an integer of 1 to 4, and m is an integer of 2 or less, styrene and vinyl toluene.

Further, in the above curable liquid resin composition provided according to the present invention, the vinyl monomer (a-2-1) is at least one monomer selected from the group consisting of a carboxyl-group-containing vinyl monomer, a hydroxyl-group-containing vinyl monomer and an amide-group-containing vinyl monomer.

Further, in the above curable liquid resin composition provided according to the present invention, the vinyl monomer (a-2-1) is a perfluoroalkyl-group-containing vinyl monomer.

Further, in the above curable liquid resin composition provided according to the present invention, the (meth) acrylic liquid resin (A) contains 1 to 60% by weight of a functional vinyl monomer (a-2-2) having a functional group which is inert to radical polymerization but is active to radiation.

Further, in the above curable liquid resin composition provided according to the present invention, the functional vinyl monomer (a-2-2) is a vinyl monomer having an alicyclic epoxy group.

Further, in the above curable liquid resin composition provided according to the present invention, the functional vinyl monomer (a-2-2) is a siloxane-containing vinyl monomer having a siloxane bond.

Further, in the above curable liquid resin composition provided according to the present invention, the polymerizable vinyl monomer (a-2) is a monomer prepared by further incorporating the vinyl monomer (a-2-1) to the functional vinyl monomer (a-2-2), and the (meth)acrylic liquid resin (A) contains 0 to 79% by weight of the vinyl monomer (a-2-1).

Further, in the above curable liquid resin composition provided according to the present invention, the modified product of the liquid resin is a product obtained by reacting the (meth)acrylic liquid resin (A) having active hydrogen with a isocyanic ester compound (C) having an unsaturated double bond.

Further, in the above curable liquid resin composition provided according to the present invention, the (meth) acrylic monomer (B) has a viscosity of 0.01 to 100 poise (50° C.).

Further, in the above curable liquid resin composition provided according to the present invention, $R^1$ is the formula (1) is a hydrogen atom and/or $R^1$ in the formula (2) is a hydrogen atom.

Further, in the above curable liquid resin composition provided according to the present invention, the alkyl (meth) acrylate monomer (a-1-1) of the formula (1) has an average molecular weight of at least 150.

Further, in the above curable liquid resin composition provided according to the present invention, the polyalkylene glyocl (meth)acrylate monomer (a-1-2) of the formula (2) has an average molecular weight of at least 220.

Further, in the above curable liquid resin composition provided according to the present invention, the composition has a viscosity of 0.01 to 1,000 poise (50° C.).

Further, in the above curable liquid resin composition provided according to the present invention, the composition is radiation-curable.

Further, the present invention is directed to a curable printing ink containing the above liquid resin composition.

Further, the present invention is directed to a coating composition containing the above liquid resin composition.

PREFERRED EMBODIMENTS OF THE INVENTION

In the present invention, the alkyl (meth)acrylate monomer (a1-1) of the formula (1) is used for bringing the (meth)acrylic resin into the state of a liquid. Examples of the alkyl (meth)acrylate monomer of the formula (1) includes alkyl (meth)acrylates whose alkyl groups have 4 to 22 carbon atoms, such as butyl (meth)acrylate, pentyl (meth) acrylate, heptyl (meth)acrylate, hexyl (meth)acrylate, octyl (meth)acrylate, 2-ethylhexyl (meth)acrylate, nonyl (meth) acrylate, decyl (meth)acrylate, undecyl (meth)acrylate, dodecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth) acrylate, eicosyl (meth)acrylate, heneicosyl (meth)acrylate and docosyl (meth)acrylate. Acrylates having an alkyl group having preferably 8 to 20 carbon atoms, more preferably 10 to 18 carbon atoms, or methacrylates corresponding thereto, give a liquid resin having a desirable viscosity. When the number of carbon atoms is 3 or less, it is difficult to obtain a liquid resin. When the number of carbon atoms is 23 or more, undesirably, it is difficult to increase a polymerization degree, and crystallization proceeds, so that an obtained liquid resin has a high viscosity and a special heating system is required for forming a film.

The average of the molecular weight of the alkyl (meth) acrylate monomer used in the present invention is at least 150, preferably in the range of from 160 to 350. When the average of the molecular weight is outside the above range, it is difficult to obtain a liquid resin having a viscosity in a desirable range.

In the present invention, the alkylene glycol (meth) acrylate monomer (a-1-2) is used for bringing the (meth) acrylic resin into the state of a liquid and for controlling the compatibility the liquid resin with other components by changing the polarity of the liquid resin.

Examples of the alkylene glycol (meth)acrylate of the formula (2) include methoxytriethylene glycol (meth) acrylate, methoxytetraethylene glycol (meth)acrylate, ethoxytetraethylene glycol (meth)acrylate, propoxytetraethylene glycol (meth)acrylate, n-butoxytetraethylene glycol (meth)acrylate, n-pentoxytetraethylene glycol (meth) acrylate, tripropylene glycol (meth)acrylate, tetrapropylene glycol (meth)acrylate, methoxytripropylene glycol (meth) acrylate, methoxytetraropylenen glycol (meth)acrylate, ethoxytetrapropylene glycol (meth)acrylate, propoxytetrapropylene glycol (meth)acrylate, n-butoxytetrapropylene glycol (meth)acrylate, n-pentoxytetrapropylene glycol (meth)acrylate, polytetramethylene glycol (meth)acrylate, methoxypolytetramethylene glycol (meth)acrylate, methoxypolyethylene glycol (meth)acrylate, ethoxypolyethylene glycol (meth)acrylate, phenoxyytriethylene glycol (meth) acrylate, phenoxytetraethylene glycol (meth)acrylate, phenoxyhexaethylene glycol (meth)acrylate, phenoxypolyethylene glycol (meth)acrylate, and phenoxytetrapropylene glycol (meth)acrylate. Above all, when an acrylate having a polyoxyalkylene where m for repating units is 3 to 25, preferably 4 to 22, or a methacrylate corresponding thereto, is used, the viscosity of a copolymer can be effectively decreased. Further, the use of the above acrylate or methacrylate is preferred since the crosslinking reaction of a polyoxyalkylene side chain proceeds effectively when a composition is cured by irradiation with electron beam or γ ray. When m for the repeating units is 2 or less, it is difficult to obtain a liquid resin. When m is 26 or more, undesirably, it is difficult to increase a polymerization degree, and further, a resin is a solid at 50° C., so that a special melting system is required for forming a film.

In the present invention, the average molecular weight of the polyalkylene glycol (meth)acrylate monomer is at least 220, preferably in the range of from 250 to 700. When the above average molecular weight is outside the above range, it is difficult to obtain a liquid resin having a viscosity in a desirable range.

The amount of the alkyl (meth)acrylic monomer (a-1-1) or the polyalkylene glycol (meth)acrylate monomer (a-1-2) based on monomer components as components for the liquid resin (A) is 10 to 100% by weight, preferably 20 to 98% by weight, more preferably 40 to 95% by weight, further more preferably 40 to 90% by weight. When the above amount is smaller than the above lower limit, undesirably, a desirable viscosity can be no longer maintained.

Further, one of the (meth)acrylate monomers (a-1-1) and (a-1-2) may be used alone, while it is preferred to use both in combination in view of a decrease in viscosity and an improvement in compatibility with other components. The ratio of the (meth)acrylate monomers (a-1-1) and (a-1-2) by weight is 1:99~95:5, more preferably 5:95~90:50.

In the present invention, further, the vinyl monomer (a-2-1) having a functional group inert to radiation and a functional vinyl monomer (a-2-2) having a functional group inert to radical polymerization but active to radiation may be used as a polymerizable vinyl mnomer (a-2), for improving a cured coating film in water resistance and hardness so long as the liquid state of a resin can be maintained.

The vinyl monomer (a-2-1) includes alkyl (meth)acrylate whose alkyl group has 3 carbon atoms or less, an alkylene glycol monomer of the formula (3), 11styrene, vinylbenzene, a carboxyl-group-containing vinyl monomer, a hydroxyl-group-containing vinyl monomer, an amide-group-containing vinyl monomer and a perfluoroalkyl-group-containing vinyl monomer. Of these, a carboxyl-group-containing vinyl monomer, a hydroxyl-group-containing vinyl monomer and an amide-group-containing vinyl monomer are preferred since these vinyl monomers are excellent in the effect of imparting the capability of adhesion to a substrate. A perfluoroalkyl-group-containing vinyl monomer is preferred since it improves a cured coating film in water repellency and chemical resistance.

Specific examples of the above monomers are as follows.

Alkyl-group-possessing (meth)acrylates of which the alkyl has 3 carbon atoms or less, such as methyl methacrylate and ethyl methacrylate, alkoxy-group-containing or phenoxy-group-containing alkylene glycol (meth)acrylate monomers such as methoxydiethylene glycol (meth)acrylate, methoxytriethylene glycol (meth)acrylate, phenoxydiethylene glycol (meth)acrylate and phenoxyethylene glycol (meth) acrylate, aromatic vinyl monomers such as styrene and vinyltoluene, carboxyl-group-containing vinyl monomers such as maleic acid, fumaric acid, itaconic acid, citraconic acid, alkyl or alkenyl monomesters of these, phthalic acid β-(meth)acryloxyethyl monoester, isophthalic acid β-(meth)acryloxyethyl monoester, terephthalic acid β-(meth)acryloxyethyl monoester, succinic acid β-(meth)acryloxyethyl monoester, acrylic acid, methacrylic acid, crotonic acid and cinnamic acid, hydroxyl-group-containing vinyl monomers such as 2-hydroxyethyl (meth)acrylate, 2-hydroxypropyl (meth)acrylate, 4-hydroxybutyl (meth)acrylate, glycerol mono(meth)acrylate, diethylene glycol mono (meth)acrylate and dipropylene glycol monomethacrylate, amide-group-containing vinyl monomers, e.g., monoalkylol (meth)acrylamides such as (meth)

acrylamide, N-methylol (meth)acrylamide, N-methoxymethyl-(meth)acrylamide, N-ethoxymethyl-(meth)acrylamide, N-propoxymethyl-(meth)acrylamide, N-butoxymethyl-(meth)acrylamide and N-pentoxymethyl (meth)acrylamide, and dialkylol (meth)acrylamides such as N,N-di(methylol) acrylamide, N-methylol-N-methoxymethyl (meth) acrylamide, N,N-di(methoxymethyl) acrylamide, N-ethoxymethyl-N-methoxymethyl methacrylamide, N,N-di(ethoxymethyl) acrylamide, N-ethoxymethyl-N-propoxymethyl methacrylamide, N,N-di(propoxymethyl) acrylamide, N-butoxymethyl-N-(propoxymethyl) methacrylamide, N,N-di(butoxymethyl) acrylamide, N-butoxymethyl-N-(methoxymethyl) methacrylamide, N,N-di(pentoxymethyl) acrylamide and N-methoxymethyl-N-(pentoxymethyl) methacrylamide, perfluoroalkylalkyl (meth)acrylates having a perfluoroalkyl group having 1 to 20 carbon atoms, such as perfluoromethyl (meth)acrylate, perfluoroethylmethyl (meth)acrylate, 2-perfluorobutylethyl (meth)acrylate, 2-perfluorohexylethyl (meth)acrylate, 2-perfluorooctylethyl (meth)acrylate, 2-perfluoroisononylethyl (meth)acrylate, 2-perfluorodecylethyl (meth)acrylate, perfluoropropylpropyl (meth)acrylate, perfluorooctylpropyl (meth) acrylate, perfluorooctylamyl (meth)acrylate and perfluorooctylundecyl (meth)acrylate, and perfluoroalkyl-group-containing vinyl monomers, e.g., perfluoroalkylalkyenes such as perfluorobutylethylene, perfluorohexylethylene, perfluorooctylethylene and perfluorodecylethylene.

A plurality of the above monomers may be used.

When the liquid resin is modified with an isocyanic ester compound having an unsaturated double bond, the polymerizable vinyl monomer (a-2) for use in the liquid resin is selected from vinyl monomers containing active hydrogen which is reactive with an isocyanate group, such as carboxyl group, hydroxyl group or amide group. of these, a vinyl monomer containing a hydroxyl group is preferred in view of reactivity with an isocyanate group and a low viscosity of the liquid resin.

In the present invention, the amount of the vinyl monomer (a-2-1) based on the liquid resin which is a copolymer is 0 to 90% by weight, preferably 0 to 79% by weight, more preferably 1 to 50% by weight. When the above amount is larger than the above upper limit, undesirably, the liquid resin has a high viscosity.

In the present invention, the functional vinyl monomer (a-2-2) having a functional group which is inert to radical polymerization and its active to radiation may be used as a polymerizable vinyl monomer (a-2), for imparting the liquid resin with the capability of crosslinking under radiation. The above functional vinyl monomer includes epoxy-containing vinyl monomers such as glycidyl (meth)acrylate having an epoxy group in its molecule and siloxane-containing vinyl monomers having a siloxane bond. of the epoxy-containing vinyl monomers, a vinyl monomer containing an alicyclic epoxy group is preferred since the liquid resin containing such a vinyl monomer has the high capability of crosslinking with electron beam (EB).

In the present invention, an alicyclic-epoxy-group-containing vinyl monomer having an alicyclic epoxy group in its molecule is used as a functional vinyl monomer (a-2-2), for promoting the radiation-crosslinkability of the (meth)acrylic liquid resin (A).

The above alicyclic-epoxy-group-containing vinyl monomer is not specially limited so long as it is a compound having a radical-polymerizable vinyl group and an alicyclic epoxy group in its molecule. Above all, it is preferred to use any one of compounds of the following formulae, since difficulties such as gelation, etc., do not much take place at the time of copolymerization with the alkyl (meth)acrylate monomer or at the time of removing a solvent.

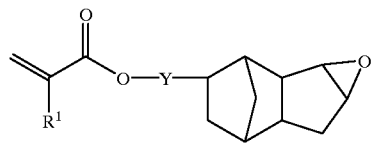

(4)

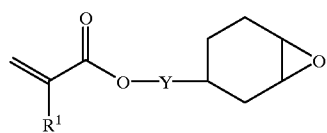

(5)

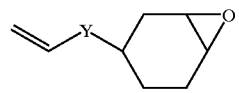

(6)

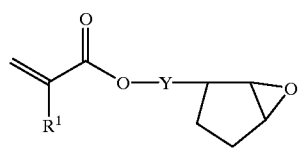

(7)

(8)

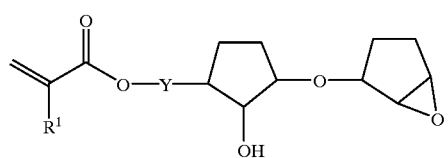

(9)

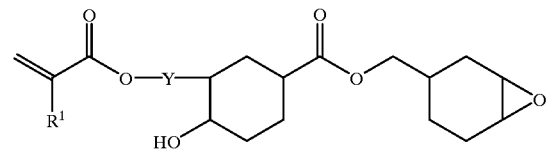

(10)

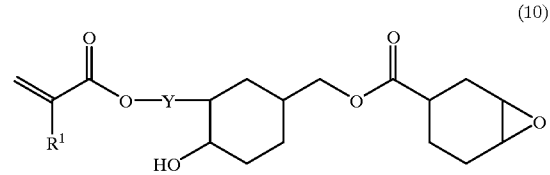

(11)

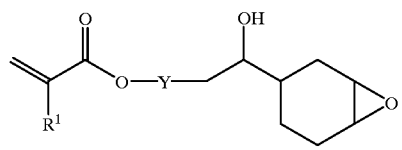

In the above formulae, $R^1$ is a hydrogen atom or methyl, and Y is a divalent group of $—\{R^4COO\}_x R^5—$ in which $R^4$ is a divalent aliphatic hydrocarbon group having 1 to 10 carbon atoms, $R^5$ is a divalent hydrocarbon group having 1 to 6 carbon atoms and x is an integer of 1 to 5.

Examples of the above alicyclic-epoxy-group-containing vinyl monomer include 3,4-epoxycyclohexylmethyl (meth)

acrylate, 1-vinyl-3,4-epoxycyclohexane and (3,4-epoxycyclohexyl-5-hydroxyhexanoiccarboxylate) (meth)acrylate.

The siloxane-containing vinyl monomer having a siloxane bond in its molecule, which is one monomer included in the functional vinyl monomer (a-2-2) used in the present invention, is used for promoting the radiation crosslinking capability of the (meth)acrylic liquid resin (A).

Examples of the above siloxane-containing vinyl monomer include (meth)acryloxyalkylalkoxysilanes such as γ-(meth)acryloxypropyltrimethoxysilane and γ-(meth)acryloxypropylmethyldimethoxysilane, (meth)acryloxyalkylalkoxyalkylsilane, trimethoxyvinylsilane, dimethoxyethylsilane, triethoxyvinylsilane, triethoxyallysilane, vinylmethyldimethoxysilane, vinylmethyldiethoxysilane and vinyltris(2-methoxyethoxy)silane.

In the present invention, the amount of the functional vinyl monomer (a-2-2) based on the liquid resin (A) is 1 to 60% by weight, preferably 5 to 50% by weight. When the above amount is smaller than the above lower limit, undesirably, a resin shows insufficient crosslinking capability, and a cured product is poor in solvent resistance. When the above amount is larger than the above upper limit, undesirably, a resin has a high viscosity in some cases or a solid resin is formed at room temperature, so that it is difficult to prepare a solventless liquid resin, and further, it is required to incorporate a large amount of a compound having a low molecular weight in order to prepare a composition having a viscosity suitable for forming a film.

When the functional vinyl monomer (a-2-2) is used as a polymerizable vinyl monomer (a-2), the vinyl monomer (a-2-1) may be further incorporated. In this case, the amount of the vinyl monomer (a-2-1) based on the liquid resin (A) is 0 to 79% by weight, preferably 1 to 50% by weight.

However, when the alicyclic-epoxy-group-containing vinyl monomer is used as a functional vinyl monomer (a-2-2), it is not desirable to use a vinyl monomer (a-2-1) having a functional group, such as a carboxyl or amide group which is capable of reacting with an epoxy group. or, when the siloxane-containing vinyl monomer is used, it is not desirable to use a hydroxyl-group-containing vinyl monomer in combination. That is because these are liable to cause a gelation when the acrylic liquid resin is synthesized.

The average of molecular weights of the entire monomers used as components for forming the (meth)acrylic liquid resin (A) is in the range of from 100 to 1,500, preferably 150 to 1,100. When the above average is outside the above range, undesirably, no liquid resin having a viscosity in a desirable range can be obtained.

When the curable liquid resin composition of the present invention is cured by irradiation with electron beam, preferably, $R^1$ in each of the formulae (1), (2) and (3) is hydrogen. The other polymerizable vinyl monomer (a-2) that can be used in this case is preferably a polymerizable vinyl monomer which has no quaternary carbon in its main chain when it is copolymerized, such as an acrylic monomer or styrene.

In the present invention, there may be used a liquid resin modified product obtained by reacting an isocyanate group of an isocyanic ester compound (C) having an unsaturated double bond with an active-hydrogen-containing liquid resin prepared from an active-11hydrogen-containing vinyl monomer (a-2-1) which is at least one monomer selected from the above carboxyl-group-containing vinyl monomer, hydroxyl-group-containing vinyl monomer, amide-group-containing vinyl monomer or the like.

In the present invention, the isocyanic ester compound (C) refers to a compound having one isocyanate group and an unsaturated double bond in its molecule, and is used for modification for introducing a radiation-active crosslinking site to the liquid resin.

Examples of the above isocyanic ester compound (C) include methacryloyloxyethyl isocyanate, vinyl isocyanate, allyl isocyanate and (meth)acryloyl isocyanate.

Further, a compound obtained by reacting a diisocyanic ester compound with the above hydroxyl-group-, carboxyl-group- or amide-group-containing vinyl monomer in equimolar amounts can be also used as an isocyanic ester compound (C). The diisocyanic ester compound includes hexane 1,6-diisocyanate, isophorone diisocyanate, 4,4'-diphenylmethane diisocyanate, polymeric diphenylmethane diisocyanate, xylylene duisocyanate, tolylene 2,4-diisocyanate, hexamethylene diisocyanate, 4-methyl-m-phenylene diisocyanate, naphthylene diisocyanate, p-phenylene diisocyanate, tetramethylxylylene diisocyanate, cyclohexylmethane diisocyanate, hydrogenated xylylene diisocyanate, tolidine diisocyanate, 2,2,4-trimethylhexamethylene diisocyanate, 2,4,4-trimethylhexamethylene diisocyanate, m-tetramethylxylylene diisocyanate, p-tetramethylxylylene diisocyanate and dimer acid diijocyanate.

In the present invention, the amount of the isocyanic ester compound (c) per mole of the vinyl monomer (a-2-1) used as a component for forming the acrylic liquid resin is 0.1 to 100 mol, preferably 1 to 100 mol.

In the present invention, the modified product of the acrylic liquid resin with the isocyanic ester compound (C) is obtained by adding the isocyanic ester compound (C) to a synthesis solution during the synthesis of the liquid resin. Otherwise, it can be also obtained by adding the isocyanic ester compound (C) to a mixture of the liquid resin with the acrylic monomer (a). For the modification, a catalyst used for the synthesis of usual urethane may be added, and the catalyst is selected from tin-containing catalysts such as tin octylate and tin 2-ethylhexanoate. The amount of the catalyst is preferably 1 to 0.01% by weight based on the iscyanic ester compound (c).

When the curable liquid resin composition of the present invention is cured by irradiation with electron beam, preferably, $R^1$ in the formula (1) is hydrogen. The polymerizable vinyl monomer (a-2) that can be used in this case is preferably a monomer having no quaternary carbon in its main chain, such as an acrylic monomer or styrene.

The (meth)acrylic liquid resin used in the present invention has a number average molecular weight of 10,000 to 200,000, preferably 11,000 to 100,000. When the above number average molecular weight is less than the above lower limit, undesirably, it is difficult to isolate a resin component from a polymerization solution in some cases, mechanical properties such as flexibility decrease, properties of a coating film such as solvent resistanc and boiling water resistance decrease, and the odor of the monomer is intensified, since the content of a component having a low molecular weight is large, and the odor of the monomer is intensified. Further, when the above number average molecular weight is greater than the above upper limit, undesirably, it is required to add a large amount of a compound having a low molecular weight in order to attain a viscosity at which the resin is capable of forming a film.

The acrylic liquid resin (A) used in the present invention can be prepared by a radical polymerization method in which a mixture of the above monomers is dissolved in, or dropwise added to, a solvent in the presence of a radical polymerization initiator. The radical polymerization initiator can be selected from known compounds, e.g., peroxides such as benzoyl peroxide, t-butyl peroxide, cumenehydroxy peroxide, lauroyl peroxide, organic peroxides (described in Taisei-sha, "Handbook of Crosslinking Agents", pages 520–535, 2nd issue), azo compounds such as azobisisobutyronitrile and azobicyclohexanenitrile, and persulfate-containing initiators such as potassium persulfate and ammonium persulfate. Above all, it is preferred to use an initiator which is less capable of capturing hydrogen, since the polymerization stably proceeds. In particular, when the alicyclic-epoxy-group-contalning vinyl monomer is used as a functional vinyl monomer (a-2-2), it is preferred to use an initiator which is less capable of capturing hydrogen, such as an azo compound.

The above solvent includes ethyl acetate, toluene, methyl ethyl ketone, benzene, dioxane, n-propanol, methanol, isopropanol, tetrahydrofuran, n-butanol, sec-butanol, tert-butanol, isobutanol, methyl cellosolve, butyl cellosolve, methyl carbitol, ethyl carbitol, methyl cellosolve acetate, ethyl cellosolve acetate and diacetone alcohol.

In the present invention, the solvent used for the synthesis is removed by a method of precipitation purification or distillation after the synthesis, whereby the liquid resin is formed. The viscosity of the obtained liquid resin or the modified product thereof, measured at 50° C., is 1 to 10,000 poise, preferably 5 to 10,000 poise, more preferably 8 to 1,000 poise. When the viscosity of the liquid resin is lower than the above lower limit, undesirably, a repelling is caused when a composition is coated to form a film or an infiltrating is caused at the time of coating a paper sheet or printing. When the above viscosity is higher than the above upper limit, undesirably, it is required to add a large amount of the acrylic monomer (B) in order to decrease the viscosity.

In the present invention, the (meth)acrylic monomer (B) having at least one unsaturated double bond in its molecule and having a number average molecular weight of 1,000 or less is used for adjusting the viscosity and the curability of the solventless liquid resin composition.

Examples of the above (meth)acrylia monomer (B) include monofunctional (meth)acrylic monomerB such as methyl (meth)acrylate, butyl (meth)acrylate, 2-hydroxyethyl (meth)acrylate, phenoxyethyl (meth)acrylate, phenoxymethyl (meth)acrylate, benzyl (meth)acrylate, isobornyl (meth)acrylate, dicyclopentyl (meth)acrylate and (dicyclopentenyl)oxy (meth)acrylate, difunctional (meth)acrylic monomers such as ethylene glycol di(meth)acrylate, diethylene glycol di(meth)acrylate, triethylene glycol di(meth)acrylate, polyethylene glycol di(meth)acrylate, tripropylene glycol di(meth)acrylate, polypropylene glycol di(meth)acrylate, 1,3-butylene glycol di(meth)acrylate, 1,6-hexanediol di(meth)acrylate, 2-methyl-1,8-octanediol diacrylate, 1,9-nonanediol di(meth)acrylate, neopentyl glycol di(meth)acrylate, 2,2-bis[4-{(meth)acryloxy-diethoxy}phenyl]propane, 2,2-bis[4-{(meth)acryloxyethoxy}phenyl]propane, 2,2-bis[4-{(meth)acryloxy-polyethoxy}phenyl]propane, 2,2-bis[4-{(meth)acryloxy-dipropoxy}phenyl]propane, 2,2-bis[4-{(meth)acryloxypropoxy}phenyl]propane, 2,2-bis[4-{(meth)acryloxy-polypropoxy}phenyl]propane and tricyclo [5.2.1.0$^{2.6}$]decanyl di(meth)acrylate, and trifunctional or higher (meth)acrylic monomers such as trimethylolpropane tri(meth)acrylate, tetramethylolmethane tri(meth)acrylate, tetramethylolethane tri(meth)acrylate, tetramethylolmethane tetra(meth)acrylate, EO-modified trimethylolpropane tri(meth)acrylate and dipentaerythritol hexa(meth)acrylate.

The viscosity of the above (meth)acrylic monomer (B) is 0.01 to 60 poise (50° C.), preferably 0.1 to 50 poise (50° C.) or 0.01 to 100 poise (30° C.). The (meth)acrylic monomer having a viscosity lower than the above lower limit has a large content having a low molecular weight, and undesirably, it has a high skin irritation value and a high volatility. The (meth)acrylic monomer having a viscosity higher than the above upper limit is ndesirable, since it has a poor function as a viscosity adjusting agent.

In the present invention, the amount ratio of the (meth)acrylic liquid resin (A) and the (meth)acrylic monomer (B) is as follows. The amount of the (meth)acrylic monomer (B) per 100 parts by weight of the (meth)acrylic liquid resin (A) is 1 to 1,000 parts by weight, preferably 2 to 500 parts by weight. When the amount ratio of the (meth)acrylic monomer (B) is larger than the above, undesirably, the characteristic properties of the liquid resin do not work, and as a result, a volume shrinkage at a curing time is intense, the adhesion to a substrate is poor, and a cured product is fragile. When the above amount ratio is smaller than the above, undesirably, a composition is poor in curability and is inferior in solvent resistance.

The viscosity of the composition of the present invention is 0.01 to 1,000 poise, preferably 0.1 to 500 poise (50° C.). The composition having a viscosity higher than the above upper limit is undesirable due to its poor workability.

In the present invention, generally, the curable liquid resin composition can be obtained by mixing the (meth)acrylic liquid resin (A) and the (meth)acrylic monomer (B), while the acrylic monomer (B) may be added to an acrylic liquid resin (A) polymerization solution before a solvent is removed, whereby the composition can be obtained concurrently with the removal of the solvent.

In the present invention, the curable liquid resin composition may contain curing agent resins such as an amino resin and a phenolic resin in order to improve its film formability and curing properties. Further, for improving the performance of a coating, the curable liquid resin composition may contain generally usable polymers such as a known polyamide resin, a cellulose derivative, a vinyl-containing resin, a polyolefin, a natural rubber derivative, an acrylic resin, an epoxy resin, a polyester and a polystyrene, reactive resin having an unsaturated group, such as a urethane acrylic resin, an epoxy acrylic resin, an alkyd resin, a rosin-modified alkyd resin and a linseed-oil-modified alkyd resin, and dry oils such as linseed oil, tung oil and soybean oil. The amount of these based on the curable liquid resin composition is preferably 40% by weight or less, more preferably 20% by weight or less. Further, a solvent, a compatibilizer, a surfactant or a lubricant may be added as required. The amount of these is 20% by weight or less, preferably 10% by weight or less.

The curable liquid resin composition of the present invention can be used as various printing inks and colored coating compositions by incorporating proper amounts of colorants made of dyestuffs or pigments such as carbon black, titanium white, phthalocyanine, ano dyestuff and quinacridone, or inorganic fillers such as Si-containing fine particles, mica and calcium carbonate.

The curable liquid resin composition of the present invention may contain a known photo-polymerization sensitizer and initiator for curing it by irradiation with radiation.

A composition for a film-forming material, containing the curable liquid resin composition of the present invention, can be applied to metal plates such as a steel plate and an aluminum plate or substrates such as a plastic film, paper, a plastic film laminated sheet, etc., by any conventional method, e.g., an application method using a roll coater, a knife coater, or the like, or a printing method such as an offset printing method, a gravure printing method, a letterpress printing method, a silk screen printing method, or the like, whereby a film (coating) having a thickness of 0.1 to 500 μm is generally formed. The film (coating) can be cured by heating it or by irradiating it with radiation such as electron beam, ultraviolet, visible light or infrared.

When the curable liquid resin composition of the present invention is cured by irradiation with electron beam, there is used an electron beam irradiation apparatus having an energy preferably in the range of from 10 to 1,000 kev, more preferably 30 to 300 keV. The dose thereof is preferably 0.1 to 100 Mrad, more preferably 0.5 to 20 Mrad. When the above dose is less than the above lower limit, no sufficiently cured product is obtained. When it is greater than the above upper limit, undesirably, a coating or a substrate are heavily damaged.

In the present invention, "to form a film" means "to form a film or coating of a resin on a substrate made of as paper, a metal, a plastic, a ceramic, or the like by a method such as a printing method, a coating method or an application method." The film or coating of a resin generally has a thickness of 0.1 to 500 μm.

EXAMPLES

The present invention will be explained more in detail with reference to Examples hereinafter, while the present invention shall not be limited thereto. In Examples, "wt %" stands for "% by weight".

⊙ Methods of measurements of number average molecular weight and viscosity are as follows.

1) Number average molecular weight: A value as a styrene in a gel permeation chromatography (Tosoh Corp., SC-8020) was used. Further, as a molecular weight distribution (Mw/Mn), a value obtained with the above apparatus was used.

2) Viscosity: A value at a shear rate of 1 to 10/sec. by a stationary viscosity measurement method using a rheometer (RDS-II, RFS-II, supplied by Rheometrics) was used.

⊙ Electron beam irradiation apparatus and irradiation conditions are as follows.

1) Area beam type electron beam irradiation apparatus Curetron EBC-200-20-30 (Nissin Hligh Voltage)

Acceleration voltage: 200 kV

The dose was adjusted in the range of 0.5 to 8 Mrad on the basis of a current amount.

2) MIN-EB (supplied by AIT)

Electron beam accelerating rate: 60 keV

The dose was adjusted in the range of 0.5 to 8 Mrad on the basis of a belt conveyor speed.

⊙ Abbreviations for compounds used in Examples and Comparative Examples stand for the following compounds.

1) Compounds used for the synthesis of acrylic liquid resins (a-1-1)
 BA: Butyl acrylate
 LA: Lauryl acrylate
 EHA: 2-Ethylhexyl acrylate
 SA: Stearyl alcohol (a-1-2)
 MTGA: Methoxytriethylene glycol monoacrylate
 AM40G: Methoxytetraethylene glycol monoacrylate
 AM90G: Methoxypolyethylene glycol (polymerization degree 9) monoacrylate
 AMP60G: Phenoxyhexaethylene glycol monoacrylate (a-2-1)
 AMP20G: Phenoxydiethylene glycol monoacrylate
 ST: Styrene
 AA: Acrylic acid
 GMA: Glycidyl methacrylate
 4HBA: 4-Hydroxybutyl acrylate
 HEA: 2-Hydroxyethyl acrylate
 AAm: Acrylamide
 F-1: 2-(Perfluorooctyl)octyl methacrylate (a-2-2)
 M-100: 3,4-Epoxycyclohexylmethyl methacrylate
 Si-1: γ-Methacryloxypropyltrimethoxyoilane 2) Compounds used as (meth)acrylic monomer (B)
 POA: Phenoxyethyl acrylate (Mn=192, η=0.10P)
 BzA: Bezyl acrylate (Mn=162, η=0.03 P)
 EGDA: Ethylene glycol diacrylate (Mn=170, η=0.06 P)
 PEG9DA: Polyethylene glycol diacrylate (Mn=508, η=0.362 P)
 NODA: 1,9-Nonanediol diacrylate (Mn=268, η=0.073 P)
 TPGDA: Tripropylene glycol diacrylate (Mn=300, η=0.12 P)
 BP4EA: 2,2-Bis[4-{acryloxypolyethoxy}phenyl]-propane (Mn=512, η=7.5 P)
 BP4PA: 2,2-Bis[4-{acryloxypolypropoxy}phenyl]-propane (Mn=560, η=17P)
 TMPTA: Trimethylolpropane triacrylate (Mn=296, η=0.95 P)
 TMPT3EO: EO-modified trimethylolpropane triacrylate, "NK Ester A-TMPT-3EO" (Mn=428, η=0.5 P) supplied by Shin-Nakamura Chemical Industry Co., Ltd.
 DPHA: Dipentaerythritol hexaacrylate (Mn=578, η=50 P)

3) Isocyanic ester compound (C) or compounds used as material therefor
 MOI: Methacryloyloxyethyl isocyanate
 TDI: Tolylene 2,4-diisocyanate
 4HBA: 4-Hydroxybutyl acrylate Examples 1–9

A 500-ml four-necked round-bottomed flask having a stirrer, a nitrogen-introducing tube, a temperature sensor and a condenser was charged with compound(o) shown in Table 1 in an amount ratio shown in Table 1. Azobisisobutyronitrile (AIBN) was used as an initiator (1% by weight based on the total monomer amount), and the monomer(s) was refluxed in an ethyl acetate solvent (monomer concentration at the charging time: 33% by weight) in a hot water bath set at 85° C. for 6 hours. Then, 0.1% by weight of ATBN was further added, and further, the mixture was continuously heated and stirred for 2 hours. After the reaction, a fractionating column was set between the reactor and the condenser, and the hot water bath temperature was increased to 95° C. The solvent was distilled off while the stirring was continued under atmospheric pressure. Further, the solvent was completely distilled off by reducing the pressure inside the reactor to 40 mmHg under the same temperature condition, to give a viscous liquid resin. The so-obtained resin was measured for a number average molecular weight (Mn), a molecular weight distribution (Mw/Mn) and a viscosity (50° C.), and Table 1 shows the results.

TABLE 1

Composition of (meth)acrylic liquid resin and results of measurement of physical properties

| Example | Composition (weight ratio) | Mn (): Mw/Mn | Viscosity (50° C.)/P(poise) |
|---|---|---|---|
| 1 | LA | 1.27E4 (3.79) | 35.3 |
| 2 | LA:AMP20 = 80:20 | 1.68E4 (3.79) | 100.0 |
| 3 | LA:ST = 90:10 | 1.20E4 (3.17) | 230.2 |
| 4 | EHA | 1.69E4 (4.17) | 122.0 |
| 5 | EHA:LA = 50:50 | 1.36E4 (3.24) | 75.4 |
| 6 | EHA:AMP20G = 80:20 | 1.58E4 (3.58) | 348.6 |
| 7 | EHA:ST = 95:5 | 1.25E4 (3.17) | 753.6 |
| 8 | LA:EHA:ST:AMP20G = 30:45:5:20 | 1.33E4 (3.98) | 247.5 |
| 9 | BA:EHA = 20:80 | 1.59E4 (2.97) | 142.3 |

Examples 10–38

Curable resin compositions prepared from the acrylic liquid resins (A) obtained in Examples 1 to 9 and acrylic monomers (B) were applied onto PET films with a 0.5-mil applicator, and irradiated with electron beam at 2 Mrad. Table 2 shows components of the curable liquid resin compositions, the curability of coatings obtained by irradiation with electron beam and residual ratios determined on the basis of weight changes found after a 50-times MEK rubbing test.

TABLE 2

Composition and curing properties of curable liquid resin composition

| Ex. | Curable resin composition (Ex. No.) (A):(B) (Weight ratio) | Viscosity (10/s) [P] | Curability ○: Cured Δ: Tacking X: Not cured | MEK Rubbing (After 50 times) Residual ratio (%) |
|---|---|---|---|---|
| 10 | Ex. 1:NODA = 2:8 | 0.15 | ○ | 95 |
| 11 | Ex. 4:NODA = 2:8 | 0.32 | ○ | 100 |
| 12 | Ex. 4:(NODA:TMPTA) = 2:(7:1) | 0.41 | ○ | 100 |
| 13 | Ex. 5:NODA = 2:8 | 0.29 | ○ | 100 |
| 14 | Ex. 9:NODA = 2:8 | 0.33 | ○ | 95 |
| 15 | Ex. 2:NODA = 2:8 | 0.31 | ○ | 100 |
| 16 | Ex. 2:BP4EA = 2:8 | 12.59 | ○ | 95 |
| 17 | Ex. 2:BP4PA = 2:8 | 24.23 | ○ | 100 |
| 18 | Ex. 2:BP4PA = 4:6 | 34.54 | ○ | 90 |
| 19 | Ex. 2:(NODA:TMPTA) = 3:(6:1) | 0.82 | ○ | 95 |
| 20 | Ex. 6:NODA = 2:8 | 0.40 | ○ | 100 |
| 21 | Ex. 6:BP4EA = 2:8 | 16.16 | ○ | 95 |
| 22 | Ex. 6:BP4PA = 2:8 | 31.09 | ○ | 100 |
| 23 | Ex. 6:BP4PA = 3:7 | 42.05 | ○ | 95 |
| 24 | Ex. 6:EGDA = 2:8 | 0.34 | ○ | 100 |
| 25 | Ex. 6:TMPTA = 2:8 | 3.09 | ○ | 100 |
| 26 | Ex. 6:DPHA = 3:7 | 89.53 | ○ | 100 |
| 27 | Ex. 6:(BP4PA:POA) = 2:(7:1) | 15.09 | ○ | 95 |
| 28 | Ex. 3:(BP4PA:POA) = 2:(7:1) | 5.77 | ○ | 95 |
| 29 | Ex. 3:(BP4EA:BzA) = 2:(7:1) | 8.56 | ○ | 95 |
| 30 | Ex. 3:BP4PA = 2:8 | 18.62 | ○ | 100 |
| 31 | Ex. 7:(PB4PA:POA) = 2:(7:1) | 21.71 | ○ | 95 |
| 32 | Ex. 7:(PB4EA:BzA) = 2:(7:1) | 10.86 | ○ | 95 |
| 33 | Ex. 7:BP4EA = 2:8 | 18.86 | ○ | 100 |
| 34 | Ex. 9:NODA = 2:8 | 0.33 | ○ | 95 |
| 35 | Ex. 8:BP4EA = 2:8 | 15.09 | ○ | 100 |
| 36 | Ex. 8:BP4PA = 2:8 | 29.03 | ○ | 100 |
| 37 | Ex. 7:(PB4EA:DPHA) = 2:(7:1) | 18.23 | ○ | 100 |
| 38 | Ex. 7:(PB4PA:TMPTA) = 2:(6:2) | 16.39 | ○ | 100 |

Note: Ex. = Example

Examples 39–43

30 Parts by weight of titanium white was added to, and mixed with, 70 parts by weight of each of the curable resin compositions obtained in Examples 12, 17, 22, 27 and 38, and each mixture was dispersed with a sand mill to give white inks. These inks were applied onto coat paper sheets with a 0.5-mil applicator, and each coating was irradiated up to a dose of 2 Mrad to give cured coatings having excellent gloss. Table 3 shows the results of MEK rubbing test and bending test (in which a 1 mm φ metal test rod was used and angles and numbers of times before the coatings were broken were measured: ⊙: 180 degrees, at least 5 times, ○: 180 degrees, 1 to 4 times, Δ: 90 to 130 degrees, X: <90 degrees) of the so-obtained coatings together with viscosity values of the inks at 30 and 50° C.

TABLE 3

Viscosity values and curing properties of electron-beam-curable inks

| Ex. | Curable resin composition Example No. | Viscosity [P] (10/s) 30° C. | Viscosity [P] (10/s) 50° C. | MEK rubbing (50 times) Residual ratio (%) | Bending test |
|---|---|---|---|---|---|
| 39 | Example 12 | 17.2 | 12.2 | 100 | ○ |
| 40 | Example 17 | 152 | 126.8 | 100 | ○ |
| 41 | Example 22 | 354 | 223.9 | 100 | ⊙ |
| 42 | Example 27 | 110 | 78.3 | 90 | ⊙ |
| 43 | Example 38 | 124 | 90.6 | 100 | ⊙ |

Note: Ex. = Example

Examples 44–60

A 500-ml four-necked round-bottomed flask having a stirrer, a nitrogen-introducing tube, a temperature sensor and a condenser was charged with compounds shown in Table 4 in a mixing ratio shown in Table 4. Azobisisobutyronitrile (AIBN) was used as an initiator (1% by weight based on the total amount of charged monomers), and the monomers were refluxed in an ethyl acetate solvent (monomer concentration at the charging time: 33% by weight) in a hot water bath set at 85° C. for 6 hours. Then, 0.1% by weight of AIBN was further added, and further, the mixture was continuously heated and stirred for 2 hours. After the reaction, a fractionating column was set between the reactor and the condenser, and the hot water bath temperature was increased to 95° C. The solvent was distilled off while the stirring was continued under atmospheric pressures Further, the solvent was completely distilled off by reducing the pressure inside the reactor to 40 mmHg under the same temperature condition, to give a viscous liquid resin. The so-obtained resin was measured for a number average molecular weight (Mn), a molecular weight distribution (Mw/Mn) and a viscosity (50° C.), and Table 4 shows the results.

TABLE 4

Composition of (meth)acrylic liquid resin and results of measurement of physical properties

| Example | Composition (weight ratio) | Mn (): Mw/Mn | Viscosity (50° C.) [P (poise)] |
|---|---|---|---|
| 44 | LA:AA = 90:10 | 1.60E4 (3.1) | 64 |
| 45 | LA:AA = 60:40 | 1.62E4 (2.8) | 500 |
| 46 | LA:GMA = 90:10 | 1.43E4 (2.5) | 42 |
| 47 | LA:AAm = 90:10 | 1.91E4 (3.4) | 50 |
| 48 | LA:HEA = 80:20 | 1.53E4 (2.2) | 94 |
| 49 | LA:4HBA = 80:20 | 1.54E4 (2.2) | 78 |
| 50 | LA:MTGA = 40:60 | 1.80E4 (3.2) | 70 |
| 51 | LA:AMP20G:AA = 80:15:5 | 1.36E4 (2.3) | 103 |
| 52 | EHA:AA = 95:5 | 1.48E4 (2.6) | 170 |
| 53 | EHA:GMA = 90:10 | 1.38E4 (2.3) | 168 |
| 54 | EHA:AAm = 90:10 | 1.74E4 (3.5) | 200 |
| 55 | EHA:4HBA = 90:10 | 1.48E4 (2.5) | 188 |
| 56 | EHA:MTGA = 70:30 | 1.45E4 (2.8) | 120 |
| 57 | EHA:MTGA = 60:40 | 1.67E4 (3.4) | 110 |
| 58 | EHA:4HBA:ST = 80:15:5 | 1.29E4 (2.1) | 400 |
| 59 | EHA:AMP20G:AA = 80:15:5 | 1.68E4 (3.4) | 600 |
| 60 | ERA:MTGA:AA = 80:15:5 | 1.79E4 (3.9) | 580 |

Examples 61–86

Curable resin compositions prepared from the acrylic liquid resins (A) obtained in Examples 44 to 60 and acrylic monomers (B) were applied onto PET films with a 0.5-mil applicator, and irradiated with electron beam at 2 Mrad. Table 5 shows components of the curable liquid resin compositions, the curability of coatings obtained by irradiation with electron beam and residual ratios determined on the basis of weight changes found after a 50-times MEK rubbing test.

TABLE 5

Composition and curing properties of curable liquid resin composition

| Ex. No. | Curable resin composition (Ex. No.) (A):(B) (Weight ratio) | Viscosity (10/s) [P] | Curability ◯: Cured Δ: Tacking X: Not cured | MEK Rubbing (After 50 times) Residual ratio (%) |
|---|---|---|---|---|
| 61 | Ex. 44:NODA = 2:8 | 0.27 | ◯ | 95 |
| 62 | Ex. 45:NODA = 2:8 | 0.43 | ◯ | 100 |
| 63 | Ex. 46:NODA = 2:8 | 0.26 | ◯ | 100 |
| 64 | Ex. 47:NODA = 2:8 | 0.27 | ◯ | 95 |
| 65 | Ex. 48:NODA = 2:8 | 0.31 | ◯ | 95 |
| 66 | Ex. 49:NODA = 2:8 | 0.29 | ◯ | 100 |
| 67 | Ex. 50:NODA = 2:8 | 0.29 | ◯ | 100 |
| 68 | Ex. 51:NODA = 2:8 | 0.30 | ◯ | 100 |
| 69 | Ex. 50:BP4PA = 2:8 | 22.56 | ◯ | 95 |
| 70 | Ex. 50:BP4PA = 4:6 | 29.94 | ◯ | 90 |
| 71 | Ex. 50:(BP4PA:TMPTA) = 4:(3:3) | 12.60 | ◯ | 95 |
| 72 | Ex. 50:TMPTA = 4:6 | 5.30 | ◯ | 100 |
| 73 | Ex. 52:NODA = 2:8 | 0.34 | ◯ | 100 |
| 74 | Ex. 53:NODA = 2:8 | 0.34 | ◯ | 95 |
| 75 | Ex. 54:NODA = 2:8 | 0.36 | ◯ | 100 |
| 76 | Ex. 55:NODA = 2:8 | 0.35 | ◯ | 100 |
| 77 | Ex. 56:BP4PA = 4:6 | 37.15 | ◯ | 90 |
| 78 | Ex. 56:(BP4PA:TMPTA) = 4:(3:3) | 15.63 | ◯ | 95 |
| 79 | Ex. 56:TMPTA = 4:6 | 6.58 | ◯ | 95 |
| 80 | Ex. 57:BP4EA = 2:8 | 12.83 | ◯ | 100 |
| 81 | Ex. 57:(BP4EA:DPHA) = 4:(3:3) | 38.79 | ◯ | 100 |
| 82 | Ex. 57:(DP4EA:DPHA) = 4:(4:2) | 32.09 | ◯ | 95 |
| 83 | Ex. 57:(PEG9DA:DPHA) = 4:(2:4) | 17.86 | ◯ | 100 |
| 84 | Ex. 58:(BP4PA:BzA) = 2:(7:1) | 16.96 | ◯ | 95 |
| 85 | Ex. 59:(DP4PA:POA) = 2:(7:1) | 20.75 | ◯ | 95 |
| 86 | Ex. 60:(NODA:TMPTA) = 2:(4:4) | 1.21 | ◯ | 100 |

Note:
Ex. = Example

Example 87–91

30 Parts by weight of titanium white was added to, and mixed with, 70 parts by weight of each of the curable resin compositions obtained in Examples 69, 71, 80, 83 and 85, and each mixture was dispersed with a sand mill to give white inks. These inks were applied onto coat paper sheets with a 1.0-mil applicator, and each coating was irradiated up to a dose of 2 Mrad to give cured coatings having excellent gloss. Table 6 shows the results of MEK rubbing test and bending test (in which a 1 mm φ metal test rod was used and angles and numbers of times before the coatings were broken were measured: ⊙: 180 degrees, at least 5 times, ◯: 180 degrees, 1 to 4 times, Δ: 90 to 180 degrees, X: <90 degrees) of the so-obtained coatings together with viscosity values of the inks at 30 and 50° C.

TABLE 6

Viscosity values and curing properties of electron-beam-curable inks

| Ex. | Curable resin composition Example No. | Viscosity [P] (10/s) 30° C. | 50° C. | MEK rubbing (50 times) Residual ratio (%) | Bending test |
|---|---|---|---|---|---|
| 87 | Example 69 | 407.2 | 12.2 | 95 | ⊙ |
| 88 | Example 71 | 360.0 | 126.8 | 100 | ⊙ |
| 89 | Example 80 | 350.3 | 223.9 | 100 | ◯ |
| 90 | Example 83 | 420.2 | 78.3 | 100 | ◯ |
| 91 | Example 85 | 500.7 | 90.6 | 100 | ⊙ |

Note:
Ex. = Example

Examples 92–105

A 500-ml four-necked round-bottomed flask having a stirrer, a nitrogen-introducing tube, a temperature sensor and a condenser was charged with compounds shown in Table 7 in a mixing ratio shown in Table 7. Azobisisobutyronitrile (AIBN) was used as an initiator (1% by weight based on the total amount of charged monomers), and the monomers were refluxed in an isopropanol solvent (monomer concentration at the charging time: 33% by weight) in a hot water bath set at 85° C. for 6 hours. Then, 0.1% by weight of AIBN was further added, and further, the mixture was continuously heated and stirred for 2 hours. After the reaction, a fractionating column was set between the reactor and the condenser, and the hot water bath temperature was increased to 95° C. The solvent was distilled off while the stirring was continued under atmospheric pressure. Further, the solvent was completely distilled off by reducing the pressure inside the reactor to 40 mmHg under the same temperature condition, to give a viscous liquid resin. The so-obtained resin was measured for a number average molecular weight (Mn), a molecular weight distribution (Mw/Mn) and a viscosity (50° C.), and Table 7 shows the results.

TABLE 7

Composition of (meth)acrylic liquid resin and results of measurement of physical properties

| Example | Composition (weight ratio) | Mn (): Mw/Mn | Viscosity (50° C.) [P(poise)] (10/s) |
|---|---|---|---|
| 92 | AMP-60G:AA = 95:5 | 2.04E4 (5.2) | 7,430 |
| 93 | AMP-60G:AA = 90:10 | 2.45E4 (4.9) | 9,360 |
| 94 | AMP-60G:4HBA = 80:20 | 2.21E4 (5.6) | 6,730 |
| 95 | AMP-60G:GMA = 80:20 | 1.67E4 (4.4) | 3,890 |
| 96 | AMP-60G:AAm = 95:5 | 2.01E4 (3.1) | 8,860 |
| 97 | AMP-60G:AA:EHA = 80:5:15 | 1.89E4 (2.6) | 8,030 |
| 98 | AMP-60G:AA:ST = 90:5:5 | 1.77E4 (3.4) | 9,060 |
| 99 | AMP-60G:4HBA:EHA = 70:20:10 | 2.03E4 (2.9) | 7,270 |
| 100 | AMP-60G:GMA:EHA = 70:20:10 | 1.69E4 (2.6) | 4,120 |
| 101 | AM90G:AA = 95:5 | 1.95E4 (2.9) | 211 |
| 102 | AM90G:4HBA = 80:20 | 1.88E4 (3.1) | 132 |
| 103 | AM40G:AA = 95:5 | 1.53E4 (2.0) | 189 |
| 104 | AM40G:4HBA = 80:20 | 1.64E4 (2.0) | 108 |
| 105 | AM40G:4HBA:ST = 75:20:5 | 1.61E4 (2.2) | 163 |

Examples 106–130

Curable resin compositions prepared from the acrylic liquid resins (A) obtained in Examples 92 to 105 and acrylic monomers (B) were applied onto PET films with a 0.5-mil applicator, and irradiated with electron beam at 2 Mrad. Table 8 shows components of the curable liquid resin compositions, the curability of coatings obtained by irradiation with electron beam and residual ratios determined on the basis of weight changes found after a 50-times MEK rubbing test.

TABLE 8

Composition and curing properties of curable liquid resin composition

| Ex. No. | Curable resin composition (Ex. No.) (A):(B) (Weight ratio) | Viscosity (10/s) [P] | Curability ○: Cured Δ: Tacking X: Not cured | MEK Rubbing (After 50 times) Residual ratio (%) |
|---|---|---|---|---|
| 106 | Ex. 92:BP4PA = 2:8 | 49 | ○ | 100 |
| 107 | Ex. 93:BP4PA = 2:8 | 51 | ○ | 100 |
| 108 | Ex. 94:BP4PA = 2:8 | 48 | ○ | 100 |
| 109 | Ex. 95:BP4PA = 2:8 | 43 | ○ | 100 |
| 110 | Ex. 96:BP4PA = 2:8 | 51 | ○ | 100 |
| 111 | Ex. 97:BP4PA = 2:8 | 50 | ○ | 95 |
| 112 | Ex. 98:BP4PA = 2:8 | 51 | ○ | 100 |
| 113 | Ex. 99:BP4PA = 2:8 | 49 | ○ | 95 |
| 114 | Ex. 100:BP4PA = 2:8 | 44 | ○ | 95 |
| 115 | Ex. 97:(BP4PA:TMPT3EO) = 2:(6:2) | 25 | ○ | 95 |
| 116 | Ex. 101:PEG9DA = 2:8 | 1.1 | ○ | 95 |
| 117 | Ex. 102:PEG9DA = 2:8 | 0.96 | ○ | 95 |
| 118 | Ex. 101:(PEG9DA:TMPT3EO) = 2:(6:2) | 1.2 | ○ | 100 |
| 119 | Ex. 103:BP4PA = 2:8 | 24 | ○ | 100 |
| 120 | Ex. 104:BP4PA = 2:8 | 21 | ○ | 100 |
| 121 | Ex. 105:BP4PA = 2:8 | 23 | ○ | 100 |
| 122 | Ex. 103:BP4PA = 4:6 | 40 | ○ | 95 |
| 123 | Ex. 103:NODA = 2:8 | 0.29 | ○ | 95 |
| 124 | Ex. 103:PEG9DA = 2:8 | 0.11 | ○ | 100 |
| 125 | Ex. 103:PEG14DA = 2:8 | 1.9 | ○ | 90 |
| 126 | Ex. 103:IBXA = 2:8 | 0.38 | ○ | 100 |
| 127 | Ex. 103:(BP4PA:POA) = 2:(6:2) | 8.4 | ○ | 95 |
| 128 | Ex. 103:(BP4PA:TMPT3EO) = 2:(6:2) | 12 | ○ | 100 |
| 129 | Ex. 103:(BP4PA:TMPT3EO) = 4:(4:2) | 20 | ○ | 100 |
| 130 | Ex. 103:(NODA:DPHA) = 2:(6:2) | 1.1 | ○ | 100 |

Note:
Ex. = Example

Examples 131–135

30 Parts by weight of titanium white was added to, and mixed with, 70 parts by weight of each of the curable resin compositions obtained in Examples 115, 118, 124, 126 and 130, and each mixture was dispersed with a sand mill to give white inks. These inks were applied onto coat paper sheets with a 1.0-mil applicator, and each coating was irradiated up to a dose of 2 Mrad to give cured coatings having excellent gloss. Table 9 shows the results of MEK rubbing test and bending test (in which a 1 mm φ metal test rod was used and angles and numbers of times before the coatings were broken were measured: ⊙: 180 degrees, at least 5 times, ○: 180 degrees, 1 to 4 times, Δ: 90 to 180 degrees, X: <90 degrees) of the so-obtained coatings together with viscosity values of the inks at 30 and 50° C.

TABLE 9

Viscosity values and curing properties of electron-beam-curable inks

| Ex. | Curable resin composition Example No. | Viscosity [P] (10/s) 30° C. | Viscosity [P] (10/s) 50° C. | MEK rubbing (50 times) Residual ratio (%) | Bending test |
|---|---|---|---|---|---|
| 131 | Example 115 | 450 | 86 | 95 | ⊙ |
| 132 | Example 118 | 37 | 8.3 | 100 | ⊙ |

TABLE 9-continued

Viscosity values and curing properties of electron-beam-curable inks

| Ex. | Curable resin composition Example No. | Viscosity [P] (10/s) 30° C. | 50° C. | MEK rubbing (50 times) Residual ratio (%) | Bending test |
|---|---|---|---|---|---|
| 133 | Example 124 | 3.1 | 0.73 | 100 | ⊙ |
| 134 | Example 126 | 8.7 | 1.9 | 100 | ○ |
| 135 | Example 130 | 26 | 6.4 | 100 | ⊙ |

Note:
Ex. = Example

Examples 136–145

A 500-ml four-necked round-bottomed flask having a stirrer, a nitrogen-introducing tube, a temperature sensor and a condenser was charged with compounds shown in Table 10 in a mixing ratio shown in Table 10. Azobisisobutyronitrile (AIBN) was used as an initiator (1% by weight based on the total amount of charged monomers), and the monomers were refluxed in an ethyl acetate solvent (monomer concentration at the charging time: 33% by weight) in a hot water bath set at 85° C. for 6 hours. Then, 0.1% by weight of AIBN was further added, and further, the mixture was continuously heated and stirred for 2 hours. After the reaction, a fractionating column was set between the reactor and the condenser. The solvent was distilled off at a hot water bath temperature of 85° C. while the stirring was continued under atmospheric pressure. Further, the solvent was completely distilled off by reducing the pressure inside the reactor to 40 mmHg at 60° C., to give a viscous liquid resin. The so-obtained resin was measured for a number average molecular weight (Mn), a molecular weight distribution (Mw/Mn) and a viscosity (50° C.), and Table 10 shows the results.

TABLE 10

Composition of (meth)acrylic liquid resin and results of measurement of physical properties

| Example | Composition (weight ratio) | Mn (): Mw/Mn | Viscosity (50° C.) [P (poise)] |
|---|---|---|---|
| 136 | LA:EHA:M-100 = 50:10:40 | 1.20E4 (3.1) | 3,563 |
| 137 | EHA:M-100 = 60:40 | 1.02E4 (3.8) | 4,830 |
| 138 | LA:M-100 = 60:40 | 1.31E4 (2.5) | 2,552 |
| 139 | LA:EHA:M-100 = 40:40:20 | 1.51E4 (3.4) | 700 |
| 140 | LA:EHA:M-100 = 60:20:20 | 1.53E4 (2.2) | 790 |
| 141 | SA:M-100 = 80:20 | 1.12E4 (4.5) | 847 |
| 142 | LA:M-100 = 80:20 | 1.30E4 (4.6) | 605 |
| 143 | EHA:M-100 = 80:20 | 1.80E4 (3.2) | 2,606 |
| 144 | LA:AMP-20G:M-100 = 60:20:20 | 1.18E4 (3.4) | 824 |
| 145 | LA:ST:M-100 = 70:10:20 | 1.29E4 (3.9) | 960 |

Examples 146–165

Radiation-curable liquid resin compositions prepared from the acrylic liquid resins (A) obtained in Examples 136 to 145 and acrylic monomers (B) were applied onto PET films with a 0.5-mil applicator, and the resultant coatings were irradiated with electron beam up to a dose of 2 Mrad. Table 11 shows components of the curable liquid resin compositions, the curability and flexibility of films obtained by irradiation with electron beam and residual ratios determined on the basis of weight changes found after a 50-times MEK rubbing test.

TABLE 11

Composition and curing properties of curable liquid resin composition

| Ex. No. | Radiation-curable resin composition (A(Ex. No.)):(B) (Weight ratio) | Viscosity (10/s) [P] | Curability ○: Cured Δ: Tacking X: Not cured | MEK Rubbing (After 50 times) Residual ratio (%) | FTY* |
|---|---|---|---|---|---|
| 146 | Ex. 136:NODA = 2:8 | 1.58 | ○ | 100 | ⊙ |
| 147 | Ex. 137:NODA = 2:8 | 0.67 | ○ | 100 | ○ |
| 148 | Ex. 138:NODA = 2:8 | 0.59 | ○ | 100 | ⊙ |
| 149 | Ex. 139:NODA = 2:8 | 0.48 | ○ | 100 | ○ |
| 150 | Ex. 140:NODA = 2:8 | 0.48 | ○ | 95 | ○ |
| 151 | Ex. 141:NODA = 2:8 | 0.47 | ○ | 95 | ○ |
| 152 | Ex. 142:NODA = 2:8 | 0.44 | ○ | 95 | ⊙ |
| 153 | Ex. 143:NODA = 2:8 | 1.68 | ○ | 100 | ⊙ |
| 154 | Ex. 144:NODA = 2:8 | 0.47 | ○ | 100 | ○ |
| 155 | Ex. 145:NODA = 2:8 | 0.49 | ○ | 100 | ○ |
| 156 | Ex. 137:NODA:TMPT3EO = 2:(6:2) | 1.01 | ○ | 100 | ○ |
| 157 | Ex. 139:NODA:TMPT3EO = 2:(6:2) | 0.68 | ○ | 100 | ○ |
| 158 | Ex. 139:NODA:TMPT3EO = 4:(4:2) | 4.28 | ○ | 95 | ○ |
| 159 | Ex. 141:NODA:TMPT3EO = 2:(6:2) | 0.66 | ○ | 100 | ○ |
| 160 | Ex. 144:NODA:TMPT3EO = 2:(6:2) | 0.71 | ○ | 100 | ○ |
| 161 | Ex. 137:BP4PA = 2:8 | 35.79 | ○ | 95 | ⊙ |
| 162 | Ex. 139:BP4PA = 4:6 | 24.32 | ○ | 90 | ⊙ |
| 163 | Ex. 139:BP4PA:TMPT3EO = 2:(6:2) | 13.48 | ○ | 100 | ⊙ |
| 164 | Ex. 139:BP4PA:TPGDA = | 4.07 | ○ | 100 | ○ |

TABLE 11-continued

Composition and curing properties of curable liquid resin composition

| Ex. No. | Radiation-curable resin composition (A(Ex. No.)):(B) (Weight ratio) | Viscosity (10/s) [P] | Curability ○: Cured Δ: Tacking X: Not cured | MEK Rubbing (After 50 times) Residual ratio (%) | FTY* |
|---|---|---|---|---|---|
| | 2:(4:4) | | | | |
| 165 | Ex. 144BP4PA:POA = 2:(6:2) | 0.91 | ○ | 95 | ○ |

Notes:
Ex. = Example,
FTY* = Flexibility
Flexibility test: A 1 mm Ø 2metal test rod was used and angles and numbers of times before the coatings were broken were measured: ⊙: 180 degrees, at least 5 times, ○: 180 degrees, 1 to 4 times, Δ: 90 to 180 degrees, X: <90 degrees

Examples 166–171

A 500-ml four-necked round-bottomed flask having a stirrer, a nitrogen-introducing tube, a temperature sensor and a condenser was charged with compounds shown in Table 12 in a mixing ratio shown in Table 12. Azobisisobutyronitrile (AIBN) was used as an initiator (1% by weight based on the total amount of charged monomers), and the monomers were refluxed in an ethyl acetate solvent (monomer concentration at the charging time: 33% by weight) in a hot water bath set at 85° C. for 6 hours. Then, 0.1% by weight of AIBN was further added, and further, the mixture was continuously heated and stirred for 2 hours. After the reaction, a fractionating column was set between the reactor and the condenser, and the solvent was distilled off while the stirring was continued at a hot water bath temperature of 85° C. under atmospheric pressure. Further, the solvent was completely distilled off by reducing the pressure inside the reactor to 40 mmHg at 60° C., to give a viscous liquid resin. The so-obtained resin was measured for a number average molecular weight (Mn), a molecular weight distribution (Mw/Mn) and a viscosity (50° C.), and Table 12 shows the results.

TABLE 12

Composition of (meth)acrylic liquid resin and results of measurement of physical properties

| Example | Composition (weight ratio) | Mn ( ):Mw/Mn | Viscosity (50° C.) [P (poise)] |
|---|---|---|---|
| 166 | AM40G:M-100 = 80:20 | 2.26 E4 (4.1) | 956 |
| 167 | AM40G:M-100 = 70:30 | 3.60 E4 (4.8) | 1,676 |
| 168 | AM90G:M-100 = 80:20 | 1.75 E4 (3.6) | 583 |
| 169 | AMP60G:M-100 = 80:20 | 2.64 E4 (4.5) | 745 |
| 170 | AM90G:EHA:M-100 = 30:30:40 | 3.67 E4 (2.9) | 1,580 |
| 171 | AM90G:EHA:M-100 = 40:40:20 | 1.91 E4 (3.4) | 1,080 |

Examples 172–183

Radiation-curable liquid resin compositions prepared from the acrylic liquid resins (A) obtained in Examples 166 to 171 and acrylic monomers (B) were applied onto PET films with a 0.5-mil applicator, and the resultant coatings were irradiated with electron beam under various conditions. Table 13 shows components of the curable liquid resin compositions, the curability and flexibility of films obtained by irradiation with electron beam and residual ratios determined on the basis of weight changes found after a 50-times MEK rubbing test.

TABLE 13

Composition and curing properties of curable liquid resin composition

| Ex. No. | Curable resin composition (A(Ex. No.)):(B) (Weight ratio) | Viscosity (10/s) [P] | Curability ○: Cured Δ: Tacking X: Not cured | MEK Rubbing (After 50 times) Residual ratio (%) | FTY* |
|---|---|---|---|---|---|
| 172 | Ex. 166:TPGDA = 2:8 | 4.36 | ○ | 100 | ○ |
| 173 | Ex. 167:TPGDA = 4:6 | 5.46 | ○ | 100 | ○ |
| 174 | Ex. 168:TPGDA = 4:6 | 6.94 | ○ | 100 | ⊙ |
| 175 | Ex. 169:TPGDA = 4:6 | 7.66 | ○ | 100 | ⊙ |
| 176 | Ex. 170:NODA = 4:6 | 3.96 | ○ | 100 | ○ |
| 177 | Ex. 170:NODA = 6:4 | 29.14 | ○ | 100 | ⊙ |
| 178 | Ex. 171:NODA = 4:6 | 3.40 | ○ | 95 | ○ |
| 179 | Ex. 171:(NODA:TMPTA) = 6:(2:2) | 25.62 | ○ | 100 | ○ |
| 180 | Ex. 166:BP4PA = 2:8 | 25.88 | ○ | 100 | ⊙ |
| 181 | Ex. 168:BP4PA = 2:8 | 23.45 | ○ | 100 | ⊙ |

TABLE 13-continued

Composition and curing properties of curable liquid resin composition

| Ex. No. | Curable resin composition (A(Ex. No.)):(B) (Weight ratio) | Viscosity (10/s) [P] | Curability ○: Cured Δ: Tacking X: Not cured | MEK Rubbing (After 50 times) Residual ratio (%) | FTY* |
|---|---|---|---|---|---|
| 182 | Ex. 170:(BP4PA:TPGDA) = 4:(2:4) | 13.04 | ○ | 100 | ○ |
| 183 | Ex. 171:(BP4PA:TPGDA) = 4:(2:4) | 11.20 | ○ | 100 | ⊙ |

Notes:
Ex. = Example,
FTY* = Flexibility

Examples 184–190

A 500-ml four-necked round-bottomed flask having a stirrer, a nitrogen-introducing tube, a temperature sensor and a condenser was charged with compounds shown in Table 14 in a mixing ratio shown in Table 14. Azobisisobutyronitrile (AIBN) was used as an initiator (1% by weight based on the total amount of charged monomers), and the monomers were refluxed in an ethyl acetate solvent (monomer concentration at the charging time: 33% by weight) in a hot water bath set at 85° C. for 5 hours. After the reaction, a fractionating column was set between the reactor and the condenser, and the solvent was distilled off while the stirring was continued with heating with a mantle heater under atmospheric pressure. Further, the solvent was completely distilled off by reducing the pressure inside the reactor to 40 mmHg at 100° C., to give a viscous liquid resin. The so-obtained resin was measured for a number average molecular weight (Mn), a molecular weight distribution (Mw/Mn) and a viscosity (50° C.), and Table 14 shows the results.

TABLE 14

Composition of (meth)acrylic liquid resin and results of measurement of physical properties

| Example | Composition (weight ratio) | Mn ( ):Mw/Mn | Viscosity (50° C.) [P (poise)] |
|---|---|---|---|
| 184 | EHA:Si-1 = 80:20 | 2.26 E4 (4.1) | 220 |
| 185 | EHA:AM90G:Si-1 = 60:20:10 | 3.60 E4 (4.8) | 82 |
| 186 | LA:Si-1 = 60:40 | 1.75 E4 (3.6) | 53 |
| 187 | EHA:F-1:M-100 = 80:5:15 | 1.64 E4 (4.5) | 435 |
| 186 | AM90G:EHA:F-1 = 40:55:5 | 1.67 E4 (2.9) | 97 |
| 189 | AM90G:EHA:AA = 40:55:5 | 1.91 E4 (3.4) | 122 |

Examples 190–200

Radiation-curable liquid resin compositions prepared from the acrylic liquid resins (A) obtained in Examples 184 to 189 and acrylic monomers (B) were applied onto art paper sheets with a #8 bar coater, and a PET film having a thickness of 75 μm was cast thereon each. The resultant coatings were irradiated with electron beam up to a dose of 2 MRad on the coatings of the compositions. After the irradiation, the PET films were peeled off, to give coated paper sheets which were free of a curling caused by curing-induced shrinkage and were excellent in gloss and solvent resistance. The coated paper sheets for which the resins obtained in Examples 184 to 186 were applied further heated in an oven at 80° C. for overnight (12 hours) to show improved solvent resistance. Table 15 shows components and viscosity values of the curable liquid resin compositions, and evaluation results of the curability of the coated paper sheets obtained by irradiation with electron beam, the adhesion thereof to a substrate (film non-peeling ratio by a Cellophane tape peeling test), the curling resistance thereof and the solvent resistance thereof (residual ratio determined on the basis of weight changes found after a 50-times MEK rubbing test).

TABLE 15

Composition and curing properties of curable liquid resin composition

| Ex. No. | Curable resin composition (A(Ex. No.)):(B) (Weight ratio) | Viscosity (10/s) [P] (50° C.) | Curability ○: Cured Δ: Tacking X: Not cured |
|---|---|---|---|
| 190 | 184:TPGDA = 2:8 | 0.54 | ○ |
| 191 | 184:TMPT3EO = 2:8 | 1.69 | ○ |
| 192 | 184:BS550:TMPT3EO = 1:1:8 | 1.97 | ○ |
| 193 | 185:NODA:TMPT3EO = 2:1:7 | 1.59 | ○ |
| 194 | 186:TMPT3EO = 2:8 | 1.39 | ○ |
| 195 | 186:TMPT3EO = 4:6 | 3.23 | ○ |
| 196 | 167:TPGDA = 2:8 | 0.62 | ○ |
| 197 | 188:TPGDA = 2:8 | 0.45 | ○ |
| 198 | 187:189:TPGDA:TMPT3EO = 2:1:3:4 | 2.14 | ○ |
| 199 | 188:189:TPGDA:TMPT3EO = 2:1:3:4 | 1.62 | ○ |
| 200 | 189:TPGDA:TMPT3EO = 3:3:4 | 1.70 | ○ |

| Ex. No. | Adhesion to substrate [%] | Curling resistance | Solvent resistance [%] A  B |
|---|---|---|---|
| 190 | 100 | ○ | 90 → 95 |
| 191 | 100 | ○ | 95 → 100 |
| 192 | 100 | Δ | 95 → 95 |
| 193 | 100 | ○ | 90 → 100 |
| 194 | 100 | ○ | 95 → 100 |
| 195 | 100 | ○ | 80 → 100 |
| 196 | 100 | ○ | 100 |
| 197 | 100 | ○ | 100 |
| 198 | 100 | ○ | 100 |
| 199 | 100 | ○ | 100 |
| 200 | 100 | ○ | 95 |

Notes:
Ex. = Example,
Curling resistance: ○ Flat, Δ State where a sheet was curled to some extent.
Solvent resistance: A = Solvent resistance after irradiation with electron beam, B = Solvent resistance after standing at 80° C. for 12 hours. In Example 196 and thereafter, values of solvent resistance after irradiation with electron beam are shown.

Example 201

A 500-ml four-necked round-bottomed flask having a stirrer, a nitrogen-introducing tube, a temperature sensor and a condenser was charged with 80 g of EHA and 20 g of 4HBA. Azobisisobutyronitrile (AIBN) was used as an initiator (1% by weight based on the total amount of the charged monomers), and the monomers were refluxed in an ethyl acetate solvent (monomer concentration at the charging time: 33% by weight) in a hot water bath set at 85° C. for 5 hours. After the reaction, a fractionating column was set between the reactor and the condenser, and the solvent was distilled off while the stirring was continued with heating with a mantle heater under atmospheric pressure. Further, the solvent was completely distilled off by reducing the pressure inside the reactor to 40 MmHg at 100° C., to give a viscous liquid resin having a molecular weight, Mn, of 15,100 (MW/Mn=2.8) and a viscosity of 270 P (yield 98%). To 50 g of the obtained liquid resin was added 50 g of TPGDA, and the mixture was stirred in a hot water bathset at 70° C. to form a uniform solution. Then, 10.2 g of MOI was dropwise added, and the mixture was stirred for 30 min, 0.1022 g of tin 2-ethylhexanoate was added, and the mixture was continuously stirred at 70° C. until the characteristic peak of isocyanate at or around 2,300 $cm^{-1}$ of infrared (IR) spectrum disappeared. The resultant composition obtained from the modified product of the liquid resin and TPGDA had a viscosity of 10.4 poise (50° C.).

Example 202

A 500-ml four-necked round-bottomed flask having a stirrer, a nitrogen-introducing tube, a temperature sensor and a condenser was charged with 60 g of EHA and 40 g of 4HBA. Azobisisobutyronitrile (AIBN) was used as an initiator (1% by weight based on the total amount of the charged monomers), and the monomers were refluxed in an ethyl acetate solvent (monomer concentration at the charging time: 33% by weight) in a hot water bath set at 85° C. for 5 hours. After the reaction, a fractionating column was set between the reactor and the condenser, and the solvent was distilled off while the stirring was continued with heating with a mantle heater under atmospheric pressure. Further, the solvent was completely distilled off by reducing the pressure inside the reactor to 40 mmHg at 100° C., to give a viscous liquid resin having a molecular weight, Mn, of 14,800 (MW/Mn=3.5) and a viscosity of 589 P (yield 97%).

A 500-ml four-necked round-bottomed flask having a stirrer, a nitrogen-introducing tube, a temperature sensor and a condenser was charged with 20 g of 4HBA and 20 g of ethyl. acetate. A mixture solution containing 24 g of TDI and 24 g of ethyl acetate was dropwise added with a dropping funnel. The resultant mixture was stirred in a hot water bath at 70° C. for about 30 minutes, and 0.24 g of tin 2-ethylhexanoate was added. The heating and stirring of the mixture was continued for 3 hours, to give an isocyanic ester compound having an acrylic group. To this socyanic ester compound was added 50 g of the liquid resin obtained by the above reaction, with stirring, and the mixture was stirred in a hot water bath at 60° C. for about 30 minutes until the mixture was homogeneous. Then, 0.24 g of tin 2-ethylhexanoate was added, and the mixture was continuously stirred at 60° C. until the characteristic absorption peak of isocyanate at or around 2,300 $cm^{-1}$ of infrared (IR) spectrum disappeared. After the reaction, a fractionating column was set between the reactor and the condenser, and the solvent was completely distilled off by reducing the pressure inside the reactor to 10 mmHg or lower with heating at 40° C., to give a liquid resin modified product having a viscosity of 2,060 poise (50° C.).

Examples 203–205

Radiation-curable liquid resin compositions prepared from the acrylic liquid resins obtained in Examples 201 and 202 and acrylic monomers (B) were applied onto aluminum plates with a #8 bar coater, and the resultant coatings were irradiated with electron beam up to a dose of 4 MRad. Table 16 shows components and viscosity values of the curable liquid resin compositions, and evaluation results of the curability (pencil hardness) of the coatings obtained by irradiation with electron beam, the adhesion thereof to a substrate (film non-peeling ratio by a Cellophane tape peeling test) and the solvent resistance thereof (residual ratio determined on the basis of weight changes found after a 50-times MEK rubbing test).

TABLE 16

Composition and curing properties of curable liquid resin composition

| Ex. No. | Curable resin composition (Modified product) (Ex. No.)):(B) (Weight ratio) | Viscosity (10/s) [P] (50° C.) | Curability Pencil hardness | Adhesion to substrate [%] | SR* |
|---|---|---|---|---|---|
| 203 | 201(modified product:TPGDA = 1:1) | 10.4 | HB | 100 | 100 |
| 204 | 201:TMPT3EO = 4:1 | 5.7 | H | 100 | 100 |
| 205 | 202:TPGDA = 1:1 | 15.7 | H | 100 | 100 |
| 206 | 202:TMPT3EO = 1:1 | 32.1 | 2H | 100 | 100 |

SR = Solvent resistance

INDUSTRIAL UTILITY

The present invention provides a curable liquid resin composition which is free from polluting a working environment in a coating step with compounds having a low molecular weight and being dissipated, which does not release an organic solvent or compounds having a low molecular weight into atmosphere so that a film can be formed without requiring no special exhaust gas treatment equipment. Further, the present invention provides a curable liquid resin composition which can form a film by an application method using a roll coater, a knife coater, or the like, or by a printing method such as an offset printing method, a gravure printing method, a letterpress printing method, or the like, and which can be cured by drying it under heat or by irradiating it with radiation such as electron beam, ultraviolet, visible light or infrared.

What is claimed is:

1. A curable liquid resin composition containing 100 parts by weight of the following (meth)acrylic liquid resin (A) and 1 to 1,000 parts by weight of a (meth)acrylic monomer (B) having an unsaturated double bond in its molecule and having a number average molecular weight of 1,000 or less, the (meth)acrylic liquid resin (A) being a liquid resin which is obtained by polymerizing monomers containing 10 to 100% by weight of an alkyl (meth)acrylate monomer (a-1-1) of the formula (1), $$CH_2=C(R^1)COO-R^2 \qquad (1)$$

wherein $R^1$ is a hydrogen atom or $CH_3$ and $R^2$ is an alkyl group having 4 to 22 carbon atoms, and/or an alkylene glycol (meth)acrylate monomer (a-1-2) of the formula (2), $$CH_2=C(R^1)COO\,(C_nH_{2n}O)_mR^3 \qquad (2)$$

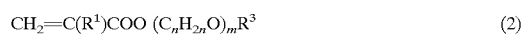

wherein $R^1$ is a hydrogen atom or $CH_3$, $R^3$ is an alkyl group having 1 to 5 carbon atoms or a phenyl group, n is an integer of 1 to 3, and m is an integer of 3 to 25, and 0 to 90% by weight of other polymerizable vinyl monomer (a-2), an average of molecular weights of all the monomers being 150 to 1,500, the liquid resin having a number average molecular weight of 10,000 to 200,000 and a viscosity of 1 to 10,000 poise (50° C.), or the (meth)acrylic liquid resin (A) being a modified product of the above liquid resin.

2. A curable liquid resin composition according to claim 1, wherein the polymerizable vinyl monomer (a-2) is a vinyl monomer (a-2-1) having a functional group inert to radiation.

3. A curable liquid resin composition according to claim 2, wherein the vinyl monomer (a-2-1) is a component for forming the (meth)acrylic liquid resin (A) and contained therein in an amount of 1 to 50% by weight.

4. A curable liquid resin composition according to claim 2, wherein the vinyl monomer (a-2-1) is at least one monomer selected from the group consisting of alkyl (meth)acrylate whose alkyl group has 3 carbon atoms or less, an alkylene glycol (meth)acrylate monomer of the formula (3),

$$CH_2=C(R^1)COO(C_nH_{2n}O)_mR^3 \qquad (3)$$

wherein $R^1$ is a hydrogen atom or $CH_3$, $R^3$ is an alkyl group having 1 to 5 carbon atoms or a phenyl group, n is an integer of 1 to 4, and m is an integer of 2 or less, styrene and vinyltoluene.

5. A curable liquid resin composition according to claim 2, wherein the vinyl monomer (a-2-1) is at least one monomer selected from the group consisting of a carboxyl-group-containing vinyl monomer, a hydroxyl-group-containing vinyl monomer and an amide-group-containing vinyl monomer.

6. A curable liquid resin composition according to claim 2, wherein the vinyl monomer (a-2-1) is a perfluoroalkyl-group-containing vinyl monomer.

7. A curable liquid resin composition according to claim 2, wherein the polymerizable vinyl monomer (a-2) is a functional vinyl monomer (a-2-2) having a functional group which is inert to radical polymerization but is active to radiation.

8. A curable liquid resin composition according to claim 7, wherein the functional vinyl monomer (a-2-2) is a component for forming the (meth)acrylic liquid resin (A) and contained therein in an amount of 1 to 60% by weight.

9. A curable liquid resin composition according to claim 7, wherein the functional vinyl monomer (a-2-2) is a vinyl monomer having an alicyclic epoxy group.

10. A curable liquid resin composition according to claim 7, wherein the functional vinyl monomer (a-2-2) is a siloxane-based vinyl monomer having a siloxane bond.

11. A curable liquid resin composition according to claim 7, wherein the polymerizable vinyl monomer (a-2) is a monomer prepared by further incorporating the vinyl monomer (a-2-1) to the functional vinyl monomer (a-2-2).

12. A curable liquid resin composition according to claim 11, wherein the vinyl monomer (a-2-1) is a component for forming the (meth)acrylic liquid resin (A) and contained therein in an amount of 0 to 79% by weight.

13. A curable liquid resin composition according to claim 1, wherein the modified product of the liquid resin is a reaction product from the (meth)acrylic liquid resin (A) having active hydrogen and an isocyanic ester compound (C) having an unsaturated double bond.

14. A curable liquid resin composition according to claim 13, wherein the isocyanic ester compound (C) is used in an amount of 0.1 to 100 mol per mole of the vinyl monomer (a-2-1).

15. A curable liquid resin composition according to claim 1, wherein the (meth)acrylic monomer (B) has a viscosity of 0.01 to 100 poise (measured at a temperature of 30° C.).

16. A curable liquid resin composition according to claim 1, wherein the (meth)acrylic monomer (B) has a viscosity of 0.01 to 60 poise (measured at a temperature of 30° C.).

17. A curable liquid resin composition according to claim 1, wherein the (meth)acrylic monomer (B) has a number average molecular weight of 1,000 or less.

18. A curable liquid resin composition according to claim 1, wherein $R^1$ in the formula (1) is a hydrogen atom and/or $R^1$ in the formula (2) is a hydrogen atom.

19. A curable liquid resin composition according to claim 1, wherein the alkyl (meth)acrylate monomer (a-1-1) of the formula (1) has an average molecular weight of at least 150.

20. A curable liquid resin composition according to claim 1, wherein the alkylene glycol (meth)acrylate monomer (a-1-2) of the formula (2) has an average molecular weight of at least 220.

21. A curable liquid resin composition according to claim 1, wherein the curable liquid resin composition has a viscosity of 0.01 to 1,000 poise (measured at a temperature of 50° C.).

22. A curable liquid resin composition according to claim 1, wherein the curable liquid resin composition is radiation-curable.

23. A curable printing ink containing the curable liquid resin composition recited in claim 22.

24. A coating composition containing the curable liquid resin composition recited in claim 22.

* * * * *